Sept. 17, 1963  
C. L. HOWLETT  
3,104,030  
PNEUMATIC DISCHARGE SYSTEMS  
Filed March 7, 1961  
3 Sheets-Sheet 1

INVENTOR.  
CHARLES L. HOWLETT

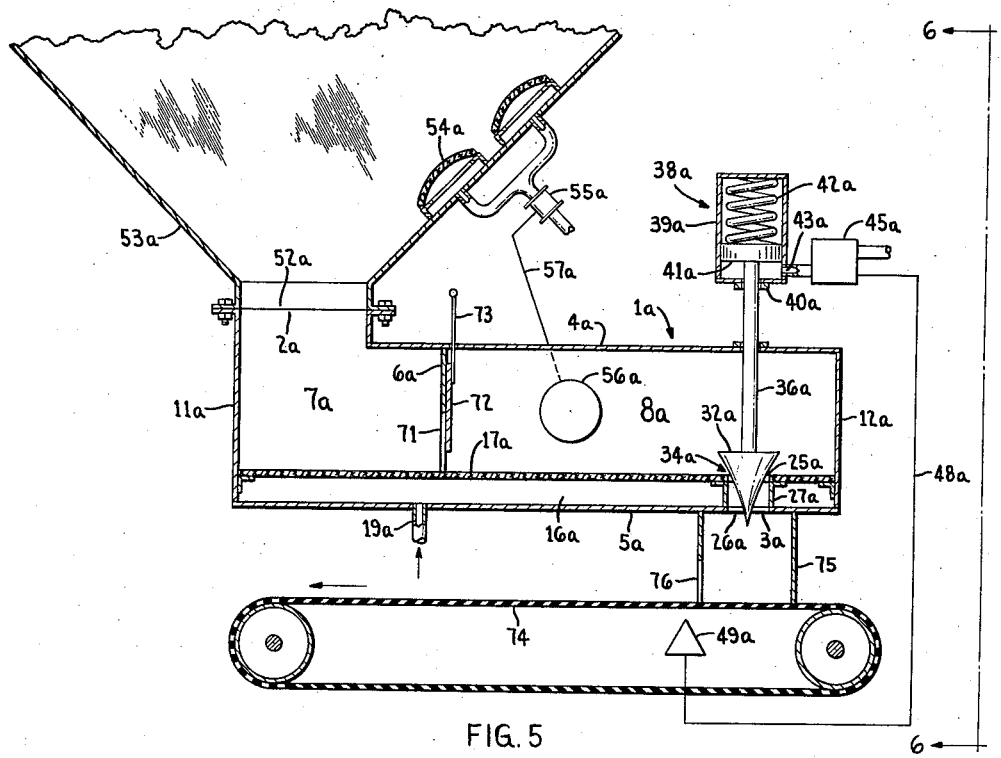
FIG. 5
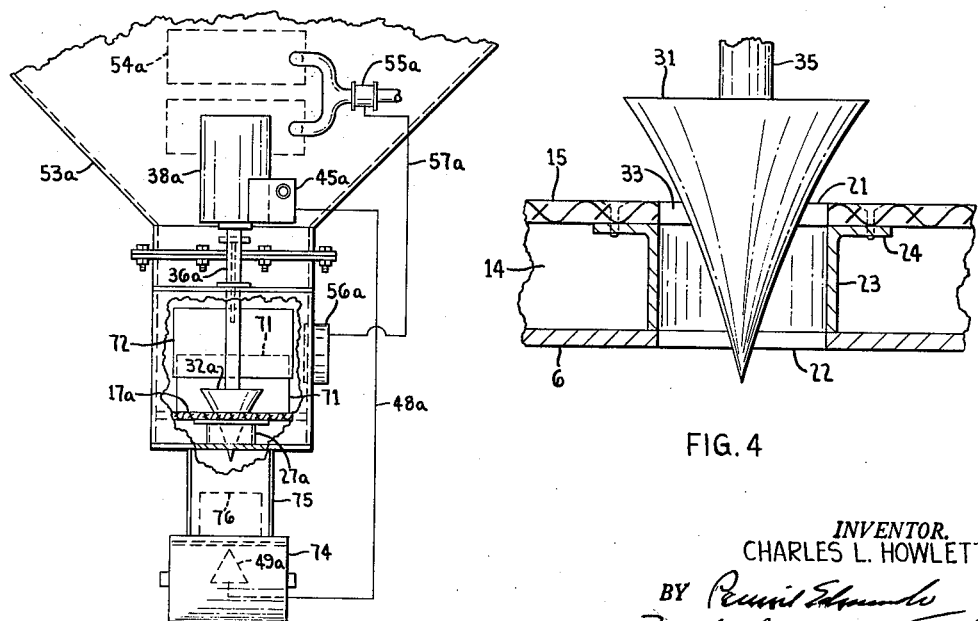
FIG. 6
FIG. 4
INVENTOR.
CHARLES L. HOWLETT

Sept. 17, 1963        C. L. HOWLETT        3,104,030

PNEUMATIC DISCHARGE SYSTEMS

Filed March 7, 1961                       3 Sheets-Sheet 3

INVENTOR.
CHARLES L. HOWLETT

United States Patent Office 3,104,030
Patented Sept. 17, 1963

3,104,030
PNEUMATIC DISCHARGE SYSTEMS
Charles L. Howlett, Alpena, Mich., assignor to Huron Portland Cement Company, Detroit, Mich., a corporation
Filed Mar. 7, 1961, Ser. No. 93,954
9 Claims. (Cl. 222—59)

The present invention relates to the handling of loose solid materials, such as hydraulic cement, and is particularly concerned with the regulation of flow of fluidizable materials in controlled fluidized beds.

Accurate feeding of pulverulent or granular materials has been difficult because of their nature. Although the individual particles are actually solid in themselves, a body or bed of such material may vary greatly in its compaction or density. Also, the pseudo-hydraulic nature of these material beds under fluidizing conditions subjects metering feeders to troubles from "starving" or "flushing" due to alternate hang-ups, and subsequent collapses of material within the feeding bins, respectively.

Although fluidized materials exhibit many of the properties of liquids, these do not include the incompressibility which is characteristic of liquids. This compressible nature of fluidized materials permits density variations which cause additional difficulty in accurate flow measurement.

Prior attempts at metering such materials have included both mechanical-displacement arrangements and aerated material beds with constant overflow and recycle of material. However, the abrasive qualities of materials such as Portland cement quickly destroy the clearances of any close-fitting parts such as screws, metering wheels and bushings, and constant overflow and return systems are undesirable in view of their height and power requirements.

In general, the preferred form of the present invention provides a casing having a material inlet, a material outlet and a material-metering chamber with a level-sensing device in the material-metering chamber effective to regulate the flow of material into the chamber in response to the level therein. A flow-measuring device, such as a weighing scale feeder, receives material from the outlet of the casing, and regulates the flow of material therethrough.

Preferably, the flow of material into and out of the material-metering chamber is through needle or tapered-plug valves submerged in the material and moved into and out of a discharge aperture. Where possible, a receiving or trap-chamber is included to supply the material-metering chamber by way of the needle valve.

A better understanding of the invention may be derived from the accompanying drawings and description, in which:

FIG. 4 is a detail view of a portion of FIG. 1, on an enlarged scale, showing the metering valve;

FIG. 5 is a sectional view of a modified form of feeder embodying the invention;

FIG. 6 is an end view taken along the lines 6—6 of FIG. 5;

Figure 1:
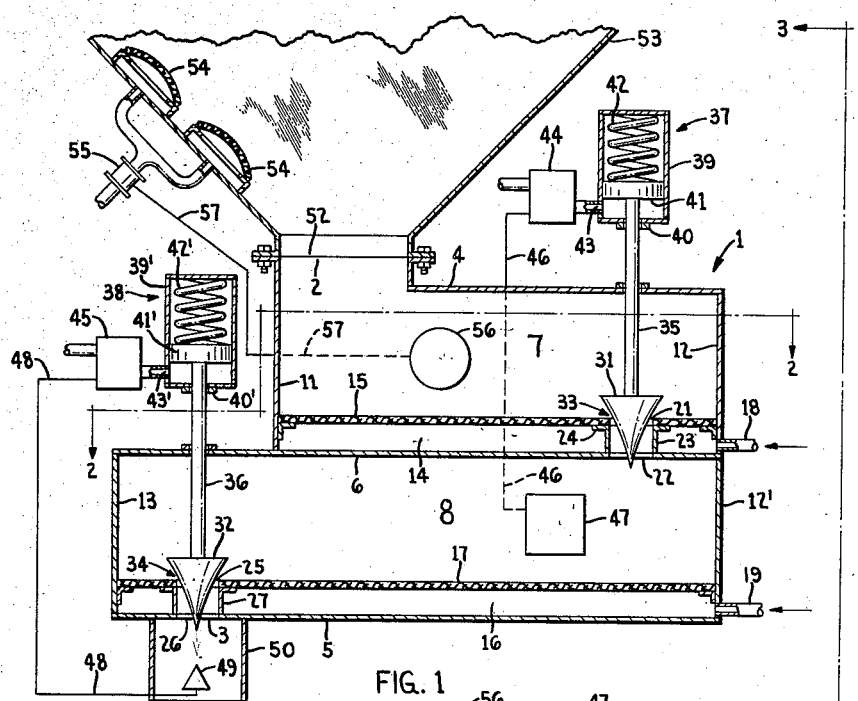
FIG. 1 is a sectional view of a preferred form of feeder of the present invention.
Figure 2:
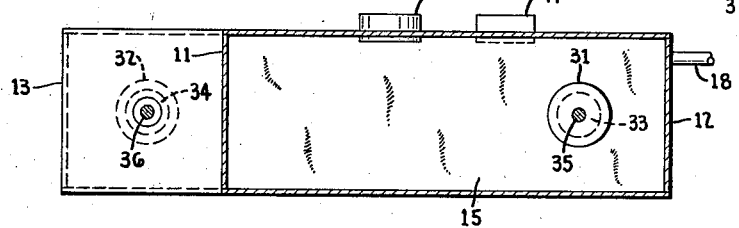
FIG. 2 is a sectional view taken along line 2—2 of FIG. 1.
Figure 3:
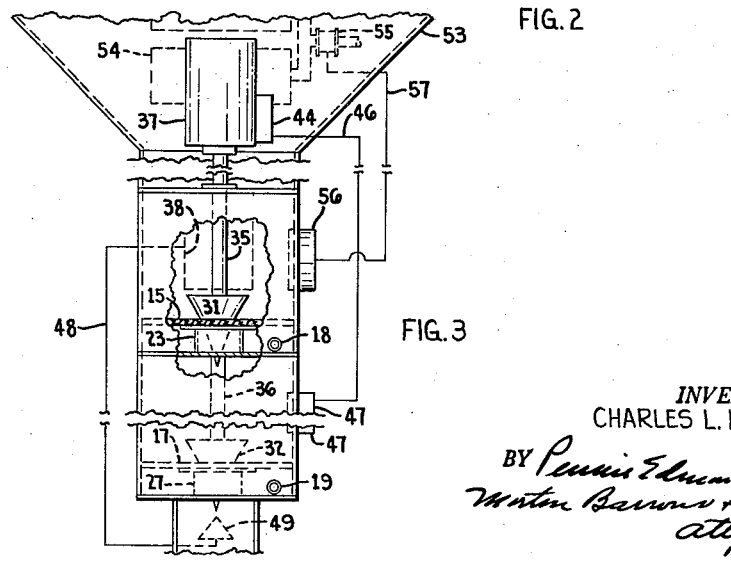
FIG. 3 is an end view along the lines 3—3 of FIG. 1.

As shown in FIGS. 1 to 4, the preferred form of feeder comprises a casing 1 having a material inlet 2 and a material outlet 3 in its top wall 4 and bottom wall 5, respectively. A horizontal wall 6 divides the casing into an upper chamber 7 and a lower chamber 8. The ends of the upper chamber 7 are closed by end walls 11 and 12, and the lower chamber 8 is closed by end wall 13 and a portion 12' of end wall 12. If desired, the chambers 7 and 8 may be separate subassemblies joined along the plane of the wall 6 to form the single casing.

The horizontal wall 6 forms the bottom of a plenum chamber 14 beneath a gas-permeable fabric deck 15 underlying the upper chamber 7. The bottom wall 5 forms the bottom of a plenum chamber 16 beneath a gas-permeable fabric deck 17 underlying the lower chamber 8. The plenum chambers 14 and 16 receive a constant supply of air or other gas through inlets 18 and 19, respectively.

The gas-permeable decks 15 and 17 may be formed of any suitable material such as porous stone plates, textile fabric, or various synthetic compositions. However, a flexible deck of low permeability, as disclosed in Schemm Patent No. 2,527,455 has been found to be of special advantage because of its adaptability and convenience, and particularly because of its continuous, substantially permanent uniform air-distributive quality, as well as its lack of interruptions due to cemented joints, such as are often necessary with other materials.

Near the end of the upper chamber 7 farthest from the inlet 2, the deck 15 and horizontal wall 6 have vertically aligned openings 21 and 22, respectively, as best seen in FIG. 4. The openings 21 and 22 are connected by a tube 23 passing through the plenum chamber 14 and secured at its lower end to the wall 6 by any suitable means, such as a weldment. The tube 23 carries a deck-support flange 24 at its upper end to which the deck may be secured in any desired manner, such as by screws or rivets. The ends of the tube are sealed against the wall 6 and the deck 15 to prevent leakage of air or gas from the surrounding plenum chamber 14.

As shown in FIG. 1, a similar pair of openings 25, 26 are provided in the deck 17 and bottom wall 5, respectively, adjacent to the end of the lower chamber remote from the openings 21, 22. A flanged tube 27 connects the openings 25 and 26, in a manner similar to the flanged tube 23.

The tubes 23 and 27 receive needle valves 31 and 32, respectively, carried on valve stems 35 and 36. The valves 31, 32 form annular metering orifices 33 and 34, respectively, with their adjacent openings 21 and 25. The valve stems 35, 36 extend upwardly through the casing to individual external motors or actuators 37 and 38, respectively. The actuators 37, 38 may be of any suitable type desired, but the actuator 37, in particular, should be continuously adjustable between its fully closed and its fully open positions. For this purpose opposed-force units have been found to be particularly satisfactory. In some cases the valve 32 may be operated as a two-position valve without modulation between its fully open and fully closed positions. The valve then has a fixed orifice in its open position. More than one such fixed orifice may be used in the chamber 8.

The actuators 37, 38 comprise rigidly mounted casings 39, 39' receiving the valve stems 35 and 36, through seals 40 and 40', respectively. Pistons 41, 41' are secured to the upper ends of the valve stems 35 and 36 and are urged downwardly by compression springs 42, 42' bearing against the upper ends of the pistons and the respective opposite ends of the casings. Each casing 39, 39' has a pressure inlet 43, 43', respectively, for admitting a fluid under pressure to the lower side of the associated piston 41, 41'.

The pressure inlets 43, 43' receive compressed air from individual pressure regulators 44 and 45, respectively, to exert on the piston 41, 41' forces opposing the forces of springs 42, 42'. The pressure regulators 44 and 45 are provided with suitable, known vents to relieve the pressures in their respective controllers when it is desired to lower the pressure beneath the pistons to lower the valve therein.

Pressure regulator 44 supplies variable amounts of pressure air beneath the piston 41 to vary the position of the valve 31 and, therefore, the size of annular metering orifice 33, in response to signals, impulses or displacement through a circuit 46 from a level indicator 47 located in the lower chamber 8. The level indicator may take any suitable, sensitive form such as a relatively large float with appropriate, accurate mechanical linkage to the regulator 44. An electronic unit or a nuclear or emission type of sensing unit may be employed, if desired.

The pressure regulator 45 varies the position of the valve 32 and the size of the orifice 34 through a circuit 48 in response to a flow rate sensing element, shown schematically at 49, in association with the outlet pipe 50. The sensor 49 may take any suitable form including arrangements such as a lever balance system, an electronic signal system, or a nuclear or emissive system, or it may be of the same general type as the sensor or indicator 47.

The inlet 2 of the casing is secured to the outlet 52 of a hopper or bin 53. If desired, the bin outlet 52 may include a screen to hold back oversize lumps or foreign matter, and may include a normally open shut-off valve to facilitate maintenance or repairs. Discharge of material from the bin is aided by aeration through several aeration pads 54 served with compressed air by a valve 55. The valve 55 is actuated by a level indicator 56 through a circuit 57.

The indicator 56 may take any suitable form adapted to open the air valve 55, if the upper chamber is not substantially completely filed with material, or if the material therein drops below the particular level desired.

In operation of the apparatus of FIGS. 1–4, compressed air from a source (not shown) is delivered through the inlets 18 and 19 to the plenum chambers 14 and 16 to pass upwardly through the gas-permeable decks 15 and 17, respectively. Compressed air at suitable pressures from other sources (not shown) is made available to the valve 55 and to the pressure regulators 44 and 45.

Assuming the chambers 7 and 8 to be empty, the respective sensing elements will fully open both the air supply valve 55 and the metering valves 31 and 32. The lack of material flow through the outlet 3 will cause the flow rate sensing element 49 to actuate the pressure regulator 45 to deliver air beneath the piston 41' of actuator 38. Therefore, the piston 41', valve stem 36 and needle valve 32 will be raised against the spring 42', consequently fully opening the annular metering aperture 34.

The absence of material in the material-metering chamber 8 will cause the level-indicator 47 to actuate the pressure regulator 44 to deliver air beneath the piston 41, thereby raising the valve 31 and fully opening the metering aperture 33.

The absence of material in the upper receiving or trap chamber 7 causes the level indicator 56 to actuate the valve 55 to deliver air through the aeration pads 54 to aerate the material in the bin and to facilitate its discharge through the outlet 52.

The material entering the upper compartment or trap chamber 7 is fluidized by the air passing upwardly through the gas-permeable deck 15 and flows through the annular aperture 33 about the valve 31 and into the material-metering chamber 8. The fluidization of the material in chamber 8 is maintained by the air passing upwardly through the gas-permeable deck 17. The material then flows through the outlet 3 and past the flow rate sensing element 49 in the outlet pipe 50. The flow rate sensing element 49 reacts to the material flow by progressively closing the valve 32 to reduce the size of the aperture 34 to restrict the flow to the desired rate. When the predetermined flow rate is reached, material accumulates behind the partially closed valve 32 in the chamber 8 until it reaches the level of the indicating device 47, whereupon the level-indicating device 47 progressively closes the valve 31 until the desired level is achieved and maintained in the chamber 8. Material accumulated in the chamber 7 then causes the level indicating device 56 to actuate the valve 55 to cut down or to cut off the air supply to the aeration pads 54 to reduce the amount of material fed to the upper chamber 7.

The controlling or sensing elements 56, 47 and 49 thereafter modulate their valves to maintain a stable rate of material flow from the casing, as long as an adequate supply of material is available from the bin 53. Hang-ups or bridges in the bin 53 which cause a momentary drop in the material level in chamber 7 are corrected by additional aeration through the pads 54 in response to the level indicator 56.

In many cases the air used to fluidize the material in the chamber 7 will be adequate for maintaining a quiet, reliable discharge of material from the bin, since the air is vented upwardly through the bin outlet into the material therein. In this case, the aerators 54 may be required only in emergencies. In some instances, the material may be very sensitive to aeration, and it may be preferable to vent fluidizing gas from the casing separately from the bin 53.

Any variations of material flow through the bin outlet 52, the aperture 33, or the aperture 34 are immediately counteracted by the sensing elements 56, 47 and 49, respectively. Therefore, if a surge of material flows from the bin 53 into the chamber 7, it will tend to slightly increase, temporarily, the material level in the chamber 8. However, even a slight increase of material level in the chamber 8 will cause an immediate modulation of the valve 31 by the pressure regulator 44 and actuator 37 in response to the level indicator 47. Similarly, any variation in the rate of material discharge from the chamber 8 through the outlet metering aperture 34 will be effective immediately through the sensing element 49, pressure regulator 45, and actuator 38 to correct the flow through the outlet metering aperture 34.

On the other hand, if the chamber 7 is temporarily starved by a hang-up in the bin, the change in the material level in the chamber 7 or in the material "head" or pressure in that chamber will cause the indicator 56 to actuate the valve 55 to cause introduction, through aerators 54, of sufficient air into the bin to break up any arch, bridge, or hang-up. When this occurs, and the hang-up is relieved, a temporary surge may occur, due to the kinetic force of the material which then suddenly falls through the outlet 52 into the chamber 7. Upon such an occurrence, the valve 31 is modulated accordingly to trap the surge before it has a chance to cause a marked effect in the material-metering chamber 8.

If, for any reason, a change in the rate of delivery is desired, the basic setting of the valves 31 and 32 may be changed to provide either larger or smaller normal sizes for the annular apertures 33, 34 when conditions are stable. This may be accomplished by any suitable, known means such as adjustable length portions in valve stems 35 and 36. When the settings are thus changed, stability of delivery is achieved almost instantly upon the re-establishment of the desired material levels within the two chambers. Consistency or uniform delivery will be retained at any point within the limits of capacity of the two valves.

The uniform aeration of the material in the chambers 8 and 7, together with the stabilization of the depth of material in material-metering chamber 8, which results from the trapping and modulating effect of the chamber 7 and the valve 31, creates a stable bed of material of substantially uniform density in the chamber 8. Since surges or variations of material flow from the bin are practically ineffective on the material in the material-metering chamber 8, the metering aperture 34 is able to deliver a highly accurate, uniform flow of material from the casing. With a constant density of the material in the chamber 8, the aperture 34 should, theoretically, deliver a constant flow of material. However, although the feeder of the present invention substantially meets these theoretical conditions, the compressibility of fluidized material prevents this ideal condition from being a total reality, and the flow rate sensing element 49 and its valve 32 are relied upon to counteract whatever variations may occur.

Although the particular actuators 37 and 38 are considered to be particularly advantageous, it should be understood that the actuators and the conical valves 31 and 32 may be replaced or substituted by any suitable operators or valves providing similar close control of the flow aperture. The actuators disclosed use opposed forces and, consequently, result in a directed return of the valve after it is first moved, temporarily, by the air pressure, so that not only gravity but also a positive force is available for the rapid return motion of the valve.

In many instances, it will be desirable to invert the valves 31 and 32 so that the apex of the metering valve, in the case of valves 31 and 32, will be pointed upwardly into the aperture. Inversion of the valves may be of advantage in cases where the material to be handled may contain foreign matter, or the material itself is sensitive to obstructions in its flow path, or tends to deaerate rather quickly. In such cases, the presence of stems, such as valve stems 35, 36, or substantial bodies such as the upward portion of the valve bodies 31 and 32, will interfere with the uniform flow of material to, around, and through the aperture 33. If the valves are inverted, the material is permitted to flow directly to and through the apertures 33, 34 without interference from solid members introduced into the material bed. Upon passing through the apertures, the material will thereafter encounter the valve bodies but will be remote from the next metering area of the chamber into which it is introduced. Any such variation in flow, or interference, as is caused by the material encountering the valves, will be smoothed out by the time the material travels the length of the casing to the next metering valve.

If foreign matter is included in the material, as is often the case, and a screen is not provided at the inlet to the casing, the feeder of the present invention is able to compensate for the lodging of such material within reasonable limits. If, for example, an object such as a stray wrapper from a pack of cigarettes passes from the bin into the casing, it will eventually become lodged in the aperture 33 or 34. When this occurs, the obstruction will reduce the flow of material through the aperture and will cause the associated downstream sensing element 47 or 49 to open the valve until the proper flow rate is restored. This opening may permit passage of the foreign object through the aperture, or the valve may operate satisfactorily in its partially obstructed condition for an indefinite period.

The conical valves disclosed are considered particularly advantageous because of the accurate nature of the annular apertures they form. Also, in installations involving extremely abrasive material, these valves are self-compensating for wear since they do not depend on mechanical seats or stops for positioning. If a valve tends to pass too much material because of wear, its controlling sensing element, whether it be a level indicator, flow rate sensing element or another form of controller, will move the valve into the openings to the exact extent required for producing the desired level or flow rate.

A modified form of the invention is shown in FIGS. 5 and 6, in which similar numerals, suffixed "a," are used to denote elements similar to those of FIGS. 1 through 4. As shown in these figures, the feeder comprises a casing 1a having a material inlet 2a and a material outlet 3a in its top wall 4a and bottom wall 5a, respectively.

A vertical wall 6a divides the casing into a first chamber 7a and a second chamber 8a. The ends of the casing are closed by end walls 11a and 12a. The bottom wall 5a forms the bottom of the plenum chamber 16a beneath the gas-permeable deck 17a underlying both the first chamber 7a and the second chamber 8a. The plenum chamber 16a receives a constant supply of air or other gas through inlet 19a.

The vertical wall 6a is provided with an aperture 71 therein adjacent the gas-permeable deck 17a. A slide gate 72 carried by a handle 73, which protrudes to the exterior of the casing, is adapted to move across the aperture 71 to the desired extent to determine the size of the opening thereof to provide a restricted passageway between the chambers.

At the end of the second chamber 8a remote from the slide gate 72, a pair of aligned openings 25a, 26a are provided in the deck 17a and bottom wall 5a, respectively, and are joined by a flanged tube 27a, as described with respect to flanged tube 23. The tube 27a receives a needle valve 32a carried on a valve stem 36a. The valve 32a forms an annular metering orifice 34a with the adjacent opening 21a. The valve stem 36a extends upwardly through the casing to an external actuator 38a. The valve 32a and actuator 38a are similar to those of FIG. 1. The actuator 38a comprises a casing 39a receiving the stem 36a through a seal 40a. The piston 41a is secured to the valve stem 36a and is urged downwardly by a compression spring 42a in the opposite end of the casing bearing against the upper end of the piston. The casing 39a has a pressure inlet 43a for admitting fluid under pressure to a lower side of the piston 41a, from a pressure regulator 45a.

The pressure regulator 45a varies the position of the valve 32a and the size of the orifice 34a in response to a flow sensing element shown schematically at 49a in association with a weighing type feeder belt 74.

Material discharging through the orifice 34a falls through an outlet box 75 onto the surface of the belt 74. The outlet box 75 has an aperture 76 therein in the direction of travel of the belt. The outlet box 75 serves to permit at least partial deaeration of the fluidized material introduced from the second chamber 8a to avoid flooding over the sides of the belt.

The inlet 2a of the casing is secured to the outlet 52a of a hopper or bin 53a. Discharge of material from the bin may be aided by aeration through several aeration pads 54a served with compressed air by a valve 55a. Valve 55a is actuated by a level indicator 56a through a circuit 57a. The indicator 56a is arranged to open the air valve if the level of the material in the second chamber 8a drops below the level desired.

The operation of the apparatus of FIGS. 5 and 6 is generally similar to that of the apparatus of FIGS. 1 through 4. However, the slide gate 72 does not modulate the flow from the first chamber 7a to the second chamber 8a, but merely serves as a restricted passage which is set at a fixed position, according to the normal requirements of the feeder, to dampen or trap out any surges of material flow which may occur from the bin 53a. The slide gate may be adapted to modulate the size of the opening in response to the material level in the second chamber 8a, if desired. The sensing element 49a may conveniently take the form of the weighing and indicating mechanism of a typical belt scale feeder.

The remaining operation of the apparatus FIGS. 5 and 6 is similar to that of the apparatus of FIGS. 1 through 4.

Figures 8, 9:
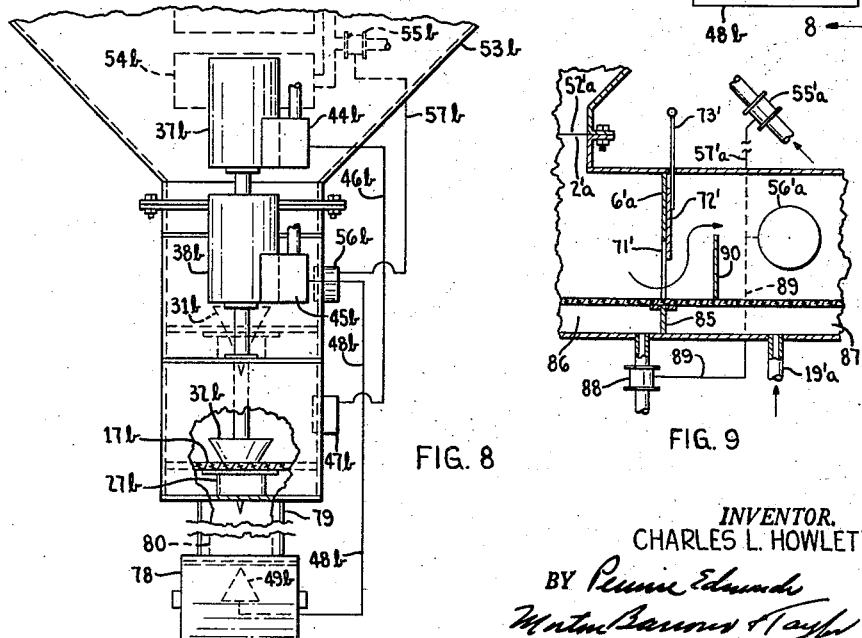
FIG. 8 is an end view along the lines 8—8 of FIG. 7.
FIG. 9 is a view, partly cut away, which is similar to FIG. 5, showing a modified form of the feeder of FIG. 5.

FIG. 9 shows a modified form of feeder of the type shown in FIG. 5, including elements similar to those of FIG. 5 and identified by similar numerals, primed. The feeder of this figure includes a partition 85 dividing the plenum chamber 16a into two subchambers 86 and 87. The subchamber 86 receives air via a valve 88 similar to the valve 55'a of FIG. 5 and similarly is responsive to the level indicator 56'a through a branch 89 of the circuit 57'a. In some cases the valved aeration through subchamber 86 may provide sufficient control to make the aeration pads 54 unnecessary. The subchamber 87 receives air via the inlet 19'a. In the metering chamber 8'a and between the gate 72' and the level indicator 56'a, a weir 90 extends upwardly from the deck 17'a and across the width of the chamber. The weir 90 stops short of the top wall 4'a to provide an overflow passage 91 for material entering through the aperture 71.

In operation a constant supply of air or gas is delivered through inlet 19'a to the subchamber 87 while the valve 88 controls the aeration of the material in the first chamber 7'a in response to the level indicator 56'a. The valve 55'a similarly controls the aeration pads (not shown) of the vessel 53'a. Either or both of the valves 55'a and 88 may be of the continuously variable type, rather than a simple open and shut type.

The weir 90 augments the control or trapping effect of the gate 72' by providing a further restricted passage to the flow of material to help smooth out surges in flow. The remainder of the operation is similar to that of the feeder of FIG. 5.

Figure 7:
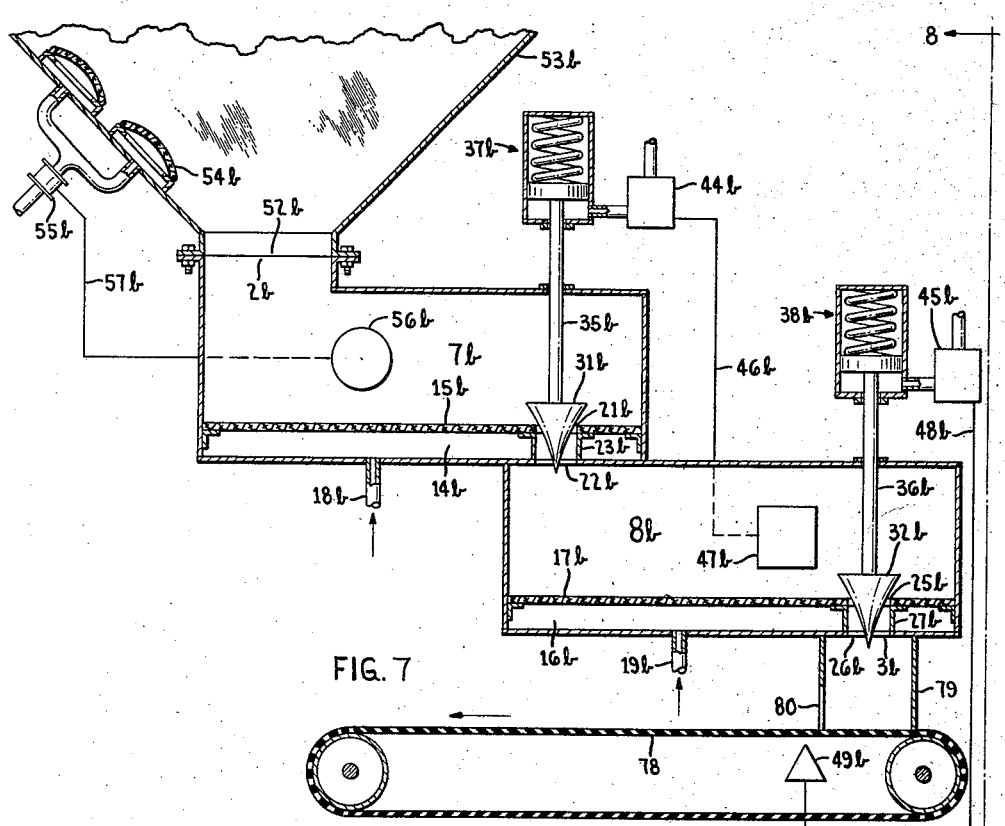
FIG. 7 is a sectional view of a further modified form of the invention.

A further modified form of the invention is shown in FIGS. 7 and 8, in which similar numerals, suffixed "b," are used to denote similar elements to those of the apparatus of FIGS. 1 through 4. As shown in these figures, the feeder comprises a first chamber 7b and a second chamber 8b, with the first chamber 7b having a material inlet 2b and the second chamber 8b having a material outlet 3b. The chambers 7b and 8b communicate by means of a pair of aligned openings 21b and 22b which are joined by a flanged tube 23b.

A plenum chamber 14b is formed in the lower portion of the chamber 7b and underlies a gas-permeable deck 15b therein. The chamber 8b has a gas-permeable deck 17b forming a floor therein and having a plenum chamber 16b therebeneath. The plenum chambers 14b and 16b receive a supply of air or other gas through inlets 18b and 19b, respectively.

In the chamber 7b, the opening 21b receives a valve 31b supported on a valve stem 35b which extends to the exterior of the casing and is actuated by an actuator 37b. The actuator 37b is actuated by a pressure regulator 44b in response to a level sensing mechanism 47b by means of a circuit 46b.

In the chamber 8b, a pair of aligned openings 25b and 26b are located in the gas-permeable deck 17b and bottom wall 5b, respectively, and are joined by a flanged tube 27b. The opening 25b receives a valve 32b on a valve stem 36b which extends to the exterior of the casing and is actuated by an actuator 38b. The actuator 38b is actuated by a pressure regulator 45b in response to a flow rate sensing mechanism 49b associated with a weighing scale feeder 78, all as described in connection with the preceding figures. However, when the feeder includes a scale feeder 78 or similar sensing means for continuous, variable control of the flow rate, valve 32b can be variable between its fully closed and fully open positions. Similarly, more than one such variable valve may be used in the chamber 8b.

Material is delivered onto the belt of the scale feeder 78 through an outlet box 79 having an aperture 80 therein in the direction of travel of the belt. The material inlet 2b of the casing is secured to the outlet 52b of the hopper or bin 53. Discharge of material from the bin may be aided by aeration through several aeration pads 54b served with compressed air by a valve 55b. The valve 55b is actuated by a level indicator 56b through a circuit 57b. The indicator 56b is arranged to open the air valve if the upper chamber 7 is not substantially completely filled with material.

The operation of the feeder of FIGS. 7 and 8 is similar to that of FIGS. 1 through 4.

Various changes may be made in the details of the invention as disclosed without departing from the scope of the invention or sacrificing the advantages thereof.

I claim:

1. A pneumatic discharge system comprising a casing having a material inlet and a material outlet, a wall positioned to divide the casing into at least a first chamber adjacent the inlet and a second chamber adjacent the outlet, said wall forming at least in part a restricted passageway between the first and second chambers, a gas-permeable deck underlying each chamber, means for passing a gas upwardly through the deck in each chamber to fluidize overlying material, means for maintaining a substantially constant level of material in the second chamber, a valve positioned to control the flow of material from the second chamber through the casing outlet, actuating means for said valve, and a material flow rate sensing element operatively connected to and controlling the actuation means for said valve.

2. A pneumatic discharge system as set forth in claim 1 in which the means for maintaining a substantial level of material in said second chamber includes actuating means for controlling the supply of material to the first chamber, and a material level indicator in the second chamber operatively connected to and controlling the operation of said actuating means.

3. A pneumatic discharge system as set forth in claim 1 in which the means for controlling the level of material in the second chamber includes a valve positioned to control the flow of material through the restricted passageway between said chambers, actuating means for said last-mentioned valve, and a material level indicator in the second chamber operatively connected to and controlling the actuating means for said second-mentioned valve.

4. A pneumatic discharge system as set forth in claim 3 including a supply hopper for material, said supply hopper having a discharge outlet connected to the material inlet of the casing, aerating means within said supply hopper to facilitate the flow of material from said hopper into said casing, and a material level indicator in said first chamber operatively connected to and controlling the supply of gas to said aerator.

5. A pneumatic discharge system comprising a casing having a material inlet and a material outlet, a wall positioned to divide the casing into at least a first chamber adjacent the inlet and a second chamber adjacent the outlet, said wall forming at least in part a restricted passageway between said chambers, a gas-permeable deck underlying each chamber, means for passing a gas upwardly through the deck in each chamber to fluidize overlying material, a valve in the restricted passageway, actuating means for said valve, a material level indicator in the second chamber and operatively connected to and controlling the actuating means for said first valve to control the flow of material from said first chamber to said second chamber, actuating means for said second valve, and a material flow rate selector in the path of flow of material from the casing outlet operatively connected to and controlling the actuating means for said second valve.

6. A pneumatic discharge system as set forth in claim 5 including a supply hopper for material, said hopper having a discharge outlet connected to the material inlet of the casing, aerating means positioned within said supply hopper to facilitate the flow of material from said supply hopper into the casing, and a material level indicator in said first chamber operatively connected to and controlling the supply of gas to said aerator.

7. A pneumatic discharge system comprising a casing having a material inlet and a material outlet, a wall positioned to divide the casing into at least a first chamber adjacent the inlet and a second chamber adjacent the outlet, said wall forming at least in part a restricted passageway between the chambers, a gas-permeable deck underlying each chamber, means for passing a gas upwardly through the deck in each chamber to fluidize overlying material, a valve in the restricted passageway, actuating means for said valve, a material-level indicator in the second chamber operatively connected to and controlling the actuating means for said valve to maintain a stable level of material in the second chamber, and an orifice positioned to control the flow of material from the second chamber through the outlet.

8. A pneumatic discharge system as set forth in claim 7 in which the orifice is fixed in size and is provided in the gas-permeable deck of the second chamber.

9. A pneumatic feeder comprising a casing having a first chamber including a material inlet and a second chamber including a material outlet, a restricted passageway between said first and second chambers, aerating means in the lower region of each of said chambers, a modulating valve positioned to control the flow of material through said restricted passageway, actuating means for said valve, level sensing means in the second chamber operatively connected to and controlling the actuating means for said modulating valve, a second modulating valve to control the flow of material through said material outlet, actuating means for said second modulating valve, a weighing scale feeder positioned to receive material discharged through said material outlet and flow rate sensing means responsive to the weight of material on said weighing scale feeder and connected to and controlling the actuating means for said second modulating valve.

References Cited in the file of this patent

UNITED STATES PATENTS 2,331,208    Ludi  ---------------------- Oct. 5, 1943

FOREIGN PATENTS 772,125    Great Britain ----------- Apr. 10, 1957